(12) United States Patent
Paquette et al.

(10) Patent No.: US 11,977,919 B2
(45) Date of Patent: *May 7, 2024

(54) APPARATUS AND METHOD OF SECURELY AND EFFICIENTLY INTERFACING WITH A CLOUD COMPUTING SERVICE

(71) Applicant: Palantir Technologies Inc., Palo Alto, CA (US)

(72) Inventors: Daniel Paquette, Ashburn, VA (US); Huw Pryce, London (GB); Alexander Feldman, Falls Church, VA (US); Ryan Zheng, Mountain View, CA (US); Daniel Walker, Palo Alto, CA (US); Cody Moore, Menlo Park, CA (US); Patricio Velez, San Francisco, CA (US); Gustav Brodman, New York, NY (US); Jakub Kozlowski, London (GB); Eric Wong, San Mateo, CA (US); Steven Capetta, East Hampton, CT (US); Charles Post, San Francisco, CA (US); Rick White, Manassas, VA (US)

(73) Assignee: Palantir Technologies Inc., Denver, CO (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/339,622

(22) Filed: Jun. 4, 2021

(65) Prior Publication Data
US 2021/0294653 A1 Sep. 23, 2021

Related U.S. Application Data

(63) Continuation of application No. 16/401,079, filed on May 1, 2019, now Pat. No. 11,030,006, which is a
(Continued)

(51) Int. Cl.
*G06F 9/50* (2006.01)
*G06F 8/65* (2018.01)
(Continued)

(52) U.S. Cl.
CPC .............. *G06F 9/5011* (2013.01); *G06F 8/65* (2013.01); *G06F 9/44505* (2013.01); *H04L 63/20* (2013.01)

(58) Field of Classification Search
CPC ...... G06F 9/5011; G06F 8/65; G06F 9/44505; H04L 63/20
See application file for complete search history.

(56) References Cited

U.S. PATENT DOCUMENTS 9,710,259 B2 * 7/2017 Nagaraja .................. G06F 8/61
2013/0346227 A1 12/2013 Jain
(Continued)

*Primary Examiner* — Wissam Rashid
(74) *Attorney, Agent, or Firm* — Duane Morris LLP

(57) ABSTRACT

Techniques for secure and efficient interfacing with a cloud computing service are described. In an embodiment, a cloud computing management service is programmed or configured to communicate with a cloud computing service. The cloud computing management service can be accessed by software engineers that are looking to deploy a software instance to a computing device of the cloud computing service. Thus, the cloud computing management service acts as an intermediary layer in front of the cloud computing service. In an embodiment, the cloud computing management service may store one or more frequently-used system parameters for deployment of software instances. The parameters conform to company's security protocols, compliance protocols, and/or other standards.

20 Claims, 11 Drawing Sheets

Related U.S. Application Data continuation of application No. 15/831,014, filed on Dec. 4, 2017, now Pat. No. 10,324,759.

(60) Provisional application No. 62/540,889, filed on Aug. 3, 2017.

(51) Int. Cl.
*G06F 9/445* (2018.01)
*H04L 9/40* (2022.01)

(56) References Cited

U.S. PATENT DOCUMENTS

| | | | |
|---|---|---|---|
| 2015/0095497 A1* | 4/2015 | Caputo | H04L 67/51 |
| | | | 709/226 |
| 2017/0213266 A1 | 7/2017 | Balestrieri | |
| 2019/0258520 A1 | 8/2019 | Paquette | |

* cited by examiner

Workflow: Create Security_Stack

| Task Name | Status |
|---|---|
| Begin Stack Creation | Completed |
| Create Security App Server Instance | Completed |
| Create Security Database | Completed |
| Verify Projected Cost | Completed |
| Deploy Security_Stack to Cloud Computing Service | Completed |

*FIG. 6*

APPARATUS AND METHOD OF SECURELY AND EFFICIENTLY INTERFACING WITH A CLOUD COMPUTING SERVICE

CROSS-REFERENCE TO RELATED APPLICATIONS; BENEFIT CLAIM

This application claims the benefit under 35 U.S.C. § 120 as patent application Ser. No. 16/401,079, filed May 1, 2019, which claims the benefit under 35 U.S.C. § 120 of U.S. Pat. No. 10,324,759, issued Jun. 18, 2019, which claims the benefit under 35 U.S.C. § 119(e) of Provisional Application No. 62/540,889, filed Aug. 3, 2017, the entire contents of which are hereby incorporated by reference as if fully set forth herein. Applicants hereby rescind any disclaimer of claim scope in the parent application(s) or the prosecution history thereof and advise the USPTO that the claims in this application may be broader than any claim in the parent applications.

TECHNICAL FIELD

The present disclosure relates to cloud computing services. More specifically, the disclosure relates to securely and efficiently interfacing with cloud computing services.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

On-demand cloud computing services allow software engineers to deploy software instances to cloud-based computing devices, allowing the software engineers to scale up existing projects or deploy new projects. However, existing cloud computing services require software engineers to provide a wide variety of highly technical parameters and settings for the deployment. The provisioning of these parameters and settings can be time-consuming and prone to user error. Furthermore, deploying a software instance to a new cloud-based computing device runs the risk that the cloud-based computing device does not conform to expected security protocols, compliance protocols, or other best practices. This means that a new deployment of a software instance to a cloud-based computing device may pose a security risk for the software instance. What is needed is a way to efficiently deploy software instances to cloud computing devices in a secure manner.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 6 illustrates an example user interface for viewing a workflow, according to one embodiment.

Figure 1:
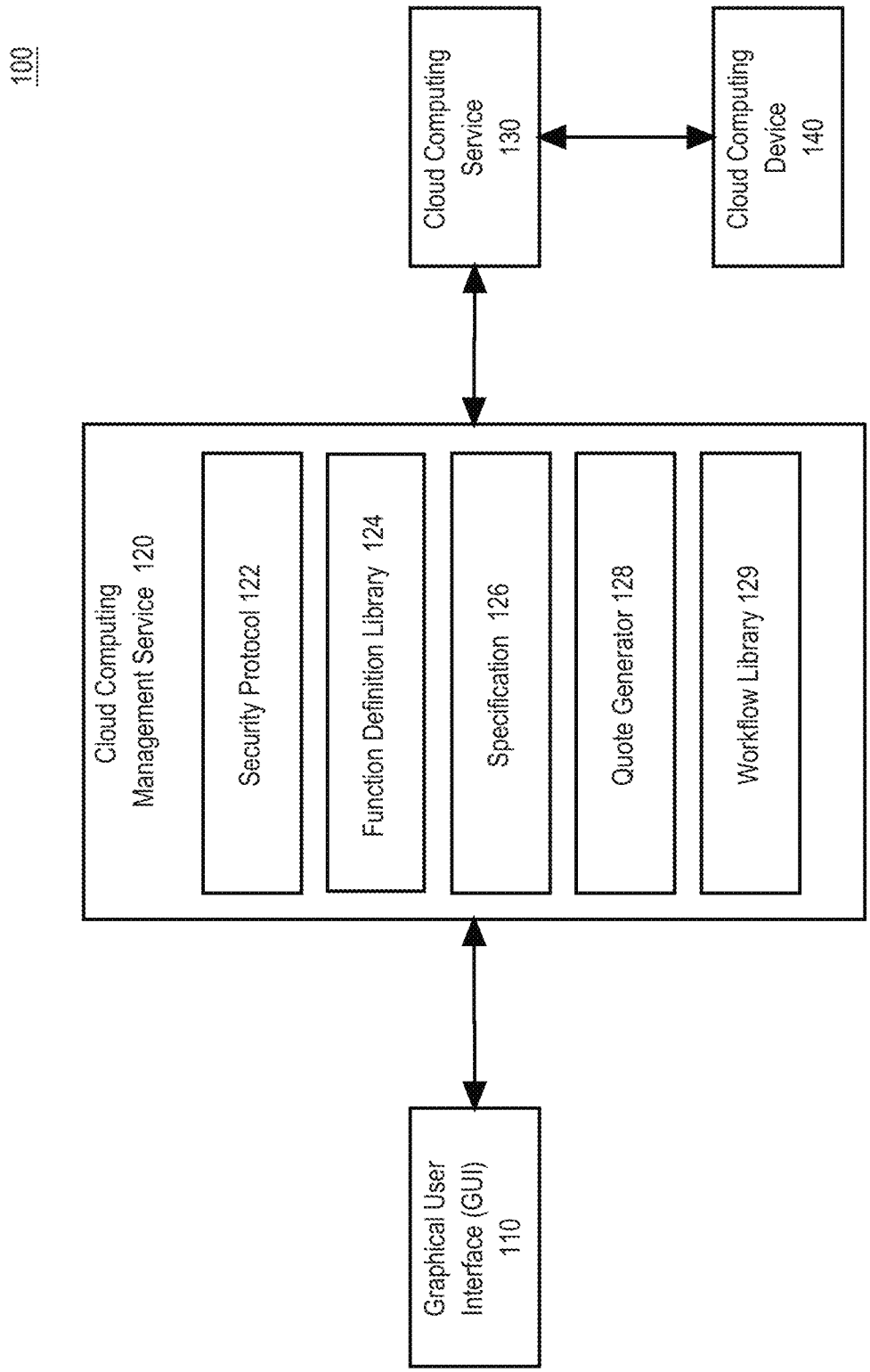
FIG. 1 is a block diagram of an example cloud computing interface system, according to one embodiment.

While each of the figures illustrates a particular embodiment for purposes of illustrating a clear example, other embodiments may omit, add to, reorder, and/or modify any of the elements shown in the figures.

DESCRIPTION OF THE EXAMPLE EMBODIMENT(S)

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1.0 GENERAL OVERVIEW
2.0 EXAMPLE COMPUTER SYSTEM IMPLEMENTATION
   2.1 SPECIFICATION
   2.2 DEPLOYMENT CONFIGURATION
   2.3 STACK CONFIGURATION
   2.4 INSTANCE CONFIGURATION
   2.5 QUOTE GENERATION
   2.6 DEPLOYING TO A CLOUD COMPUTING SERVICE
   2.7 WORKFLOWS
3.0 EXAMPLE PROCESS AND ALGORITHM
4.0 IMPLEMENTATION MECHANISMS—HARDWARE OVERVIEW
5.0 IMPLEMENTATION MECHANISMS—SOFTWARE OVERVIEW
6.0 OTHER ASPECTS OF DISCLOSURE

1.0 General Overview

In a cloud computing service, stacks of software instances can be deployed, allocated, and/or provisioned on one or more cloud computing devices. In an embodiment, a "software instance" may refer to a single host deployed, allocated, and/or provisioned on one or more computing devices. In another embodiment, a "software instance" may refer to a collection of one or more hosts with the same general configuration settings that are deployed, allocated, and/or provisioned on one or more computing devices. Configuration of the stacks of software instances can be time-consuming and can present various security risks. In repeated deployments, oftentimes similar types of stacks need to be deployed in different deployments, including security instances, search engines, database instances, data analytics instances, user interface instances, and other frequently-used stacks of instances. Reconfiguring each such deployment can be time-consuming and prone to user error that may introduce security risks.

In a cloud computing interface system, a cloud computing management service is communicatively coupled to a cloud computing service, for example, over a network or an Application Programming Interface (API). Cloud computing management service can be programmed and configured to assist in the configuration of a new software deployment to one or more cloud computing devices accessible to the cloud computing service. A deployment is a set of one or more related stacks. A stack is a set of one or more related software instances. A software instance can be any computing process, application, or script, including, but not limited to application servers, web servers, database instances, or any other similar type of computing process.

For purposes of illustrating a clear example, a concrete example of a particular deployment for a retailer will be provided. This example will be referred to as the Retailer example and is not intended to be limiting and is only intended to be used for exemplary purposes. This example will be revisited for purposes of describing various components of a cloud computing interface system. In the Retailer example, a retailer may have a need for one or more deployments, including, but not limited to deployments for a sales system, an inventory system, a forecasting system, and a billing system. Each of these deployments may include one or more stacks of software instances. For example, the sales system may include one stack of software instances to handle user access controls for the sales system, another stack of software instances to handle data storage for the sales data, another stack of software instances to act as a search engine, and yet another stack of software instances to handle generation of reports. Each stack may include one or more software instances. For example, a stack related to user access controls may include an instance of a web server for managing user access controls and an instance of a database for storing user access control data. Likewise, the search engine stack may include a search instance which is an application server to perform searches and a database instance that stores the underlying stored or indexed data for searches.

In another embodiment, in the Retailer example, the retailer may have a need to manage and deploy different stacks that are related to different stack types. For example, the retailer may need to deploy an operations ("ops") stack, one or more production stack(s), and/or one or more staging stack(s). The software instances in different stacks of different stack types may need to be isolated from one another via firewall rules or settings. For example, the ops stack may include software instances related to technical infrastructure, such as gateway(s), management node(s), and other similar technical infrastructure software instances. The production stack(s) may be used for software instances involved with user-facing application(s) and/or server(s). The staging stack(s) may be used for software instances involved with staging potential configuration changes, software changes, or other modifications to software instances prior to applying them to a production stack.

Cloud computing management service is programmed or configured to use pre-stored data to assist in the configuration of a new deployment. The pre-stored data may include a security protocol that defines security parameters for the deployment, a function definition library that describes commonly used function definitions for stacks in a deployment, a workflow library that defines commonly used workflows for a deployment. Cloud computing management service is programmed or configured to receive one or more user settings for the configuration of the new deployment via a graphical user interface (GUI). In an embodiment, the cloud computing management service can use the pre-stored data and the user settings to generate a specification for a deployment.

The cloud computing management service is programmed or configured to use the specification to generate a price quote for the cost of the deployment. The cloud computing management service allows a user to easily view and/or modify the configuration settings in the specification based on the quote. The price quote can be generated based on communication with the cloud computing service and/or based on extracting pricing data from a website.

The cloud computing management service is programmed or configured to send one or more request(s) to the cloud computing service to provision, allocate, configure, and/or deploy the requested stacks on the one or more cloud computing devices based on the specification. In response, the cloud computing service will provision the one or more cloud computing devices according to the specification.

The present cloud computing interface system thus provides for improved interaction with a cloud computing service. The cloud computing interface system provides a simplified interface that reduces the number of technical configuration settings that need to be provided by a user. The cloud computing interface system provides improved security by minimizing user error in configuring a new deployment. Likewise, the cloud computing interface system improves the efficiency in configuring new deployments, by using pre-stored data to configure the settings for a deployment. Additionally, the cloud computing interface system provides for predicted quotes for costs of deployment, thereby allowing a user that is configuring the deployment to customize the deployment.

2.0 Example Computer System Implementation

FIG. 1 illustrates an example in which the techniques described herein may be practiced, according to some embodiments. In the example of FIG. 1, cloud computing interface system 100 is a computer system programmed to perform interfacing functions between a client and a cloud computing service, and may be implemented across one or more computing devices. The example components of cloud computing interface system 100 shown in FIG. 1 are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. Cloud computing interface system 100 illustrates only one of many possible arrangements of components configured to execute the programming described herein. Other arrangements may include fewer or different components, and the division of work between the components may vary depending on the arrangement.

Cloud computing interface system 100 includes cloud computing management service 120. Cloud computing management service 120 is programmed or configured to assist a user in preparing configuration settings for a deployment in a cloud computing service 130. The configuration settings for the deployment may be defined in one or more specifications 126. In an embodiment, cloud computing management service 120 is further programmed or configured to generate a quote for pricing information for a given specification 126. Cloud computing management service 120 is communicatively coupled to cloud computing service 130. For example, cloud computing management service 120 may be coupled to cloud computing service 130 over a network and/or via an API.

Cloud computing management service 120 may be programmed or configured to store one or more pre-stored configuration settings for a deployment. For example, cloud computing management service 120 may store one or more security protocols 122 that include preferred security settings for a deployment, a stack in a deployment, or a software instance in a stack. Security protocol 122 is thus an example of a pre-stored configuration setting. In an embodiment, a security protocol 122 may be stored as any markup language or data structure, including, but not limited to JavaScript Object Notation (JSON) blob, in extensible markup language (XML), "Yet Another Markup Language" (YAML), or any other similar markup language or data structure.

Similarly, cloud computing management service 120 may store a function definition library 124 that includes one or more function definitions. A function definition is programmed or configured to describe one or more pre-configured settings for a software instance. For example, function definitions may include pre-configured settings for firewall rules, low-level system performance tuning, garbage collection, or any other feature of a software instance that needs to be easily configured for a software instance. A function definition is thus an example of a pre-stored configuration setting. In an embodiment, a function definition and/or function definition library 124 may be stored as any markup language or data structure, including, but not limited to JSON, XML, YAML, or any other similar markup language or data structure.

In an embodiment, cloud computing management service 120 may include a quote generator 128. Quote generator 128 is programmed or configured to use settings in a specification 126 to generate a projected cost quote for a deployment, a stack, or a software instance in a stack. Quote generator 128 thus allows users to easily see the projected costs for a new deployment in advance of completing deployment and causing the cloud computing service 130 to provision the deployment on cloud computing devices 140.

In an embodiment, cloud computing management service 120 may include a workflow library 129. Workflow library 120 may store pre-configured settings for one or more commonly executed workflows of configuring a stack. For example, a workflow may define a set of tasks for configuring a stack. Further details regarding workflows will be discussed herein. A workflow library thus stores pre-stored configuration settings for a deployment. In an embodiment, a workflow library 120 and/or a workflow definition may be stored as any markup language or data structure, including, but not limited to JSON, XML, YAML, or any other similar markup language or data structure.

Cloud computing management service 120 may be communicatively coupled to graphical user interface (GUI) 110. GUI 110 is programmed or configured to allow users to interact with cloud computing management service 120 via user interfaces. Examples of these user interfaces will be described herein. In an embodiment, GUI 110 is programmed or configured to receive one or more user configuration settings from a user accessing GUI 110, and send the one or more user configuration settings to cloud computing management service 120. The user configuration settings can be used to overwrite one or more pre-stored configuration settings or supplement existing pre-stored configuration settings in a specification 126. Thus, the combination of user configuration settings and pre-stored configuration settings can be used to define a custom deployment, stack, or software instance in a specification 126.

Cloud computing management service 120 may store one or more specifications 126. A specification 126 is a description of one or more configuration settings for a particular deployment, stack, or software instance. A specification 126 may include a combination of one or more pre-stored configuration settings and one or more user configuration settings. Further details regarding specification 126 will be discussed herein.

Cloud computing service 130 is communicatively coupled to one or more cloud computing devices 140. Cloud computing service 140 is programmed or configured to receive a specification 126 from cloud computing management service 120 and use the specification 126 to allocate, provision, and/or deploy the deployment, stack, or software instance defined in the specification 126 on the one or more cloud computing devices 140.

2.1 Specification

A specification defines one or more configuration settings that can be used to allocate, provision, and/or deploy a deployment, stack, and/or software instance via cloud computing service 130. The configuration settings of the specification 126 may include a combination of pre-stored configuration settings stored by cloud computing management service 120 and user configuration settings received from GUI 110. Cloud computing management service 120 may be programmed or configured to generate a new specification 126, modify the specification 126 based on user inputs provide via GUI 110, generate a quote based on specification 126, and/or submit the specification 126 to cloud computing service 130.

In an embodiment, specification 126 may be stored as any markup language or data structure, including, but not limited to JSON, XML, YAML, or any other similar markup language or data structure. For example, returning to the Retailer example, TABLE A illustrates an example of an excerpt from a specification 126 for a stack for a search engine that includes two software instances: a standard search instance and a small postgres database.

TABLE A

```
{
region: "USA-east",
stack_name: "Search_Engine_Stack",
instanceRequirements: [
  {
    instance_name: "Standard Search Instance",
    instance_count: 4,
    instance_type: "r3.xlarge",
    instance_function: "search"
    instance_hardware_CPU: 4,
    instance_hardware_ECU: 13,
    instance_hardware_RAM: "30.5GB RAM",
    instance_storage: {
      disks: [
        {
          disk_type: "GENERAL_PURPOSE_SSD",
          mount_point: "/opt",
          count: 1,
          size_in_GB: 50,
          raid_type: "NONE"
        }
      ]
      backup_size_in_GB: "NONE",
      payment_option: "ON_DEMAND"
  },
```

TABLE A-continued

```
{
  instance_name: "Small Postgres DB",
  instance_type: "m3.large",
  instance_function: "database"
  instance_hardware_CPU: 2,
  instance_hardware_ECU: 6.5,
  instance_hardware_RAM: "7.5GB RAM",
  instance_storage: {
    disks: [
      {
        disk_type: "GENERAL_PURPOSE_SSD",
        mount_point: "/opt",
        count: 1,
        size_in_GB: 100,
        raid_type: "NONE"
      },
      {
        disk_type: "GENERAL_PURPOSE_SSD_MIRROED_RAID",
        mount_point: "/data",
        count: 2,
        size_in_GB: 200,
        raid_type: "RAID_1"
      }
      backup_size_in_GB: "NONE",
      payment_option: "ON_DEMAND"
  }
]
}
```

The example specification excerpt in TABLE A defines a set of configuration settings for a standard search instance and a small postgres DB. The configuration settings include an instance type, an instance function, hardware, storage requirements, backup requirements, and payment options. In an embodiment, the configuration settings include an instance count that indicates the number of hosts to that should be deployed, allocated, and/or provisioned by cloud computing service 130 using the same general configuration settings. This list of configuration settings in TABLE A is merely exemplary and may vary based on the provider of the cloud computing service 130. The specification of TABLE A thus defines the necessary configuration settings for generating a quote for the search engine stack, and/or for deploying the search engine stack via cloud computing service 130.

2.2 Deployment Configuration

Figure 2:
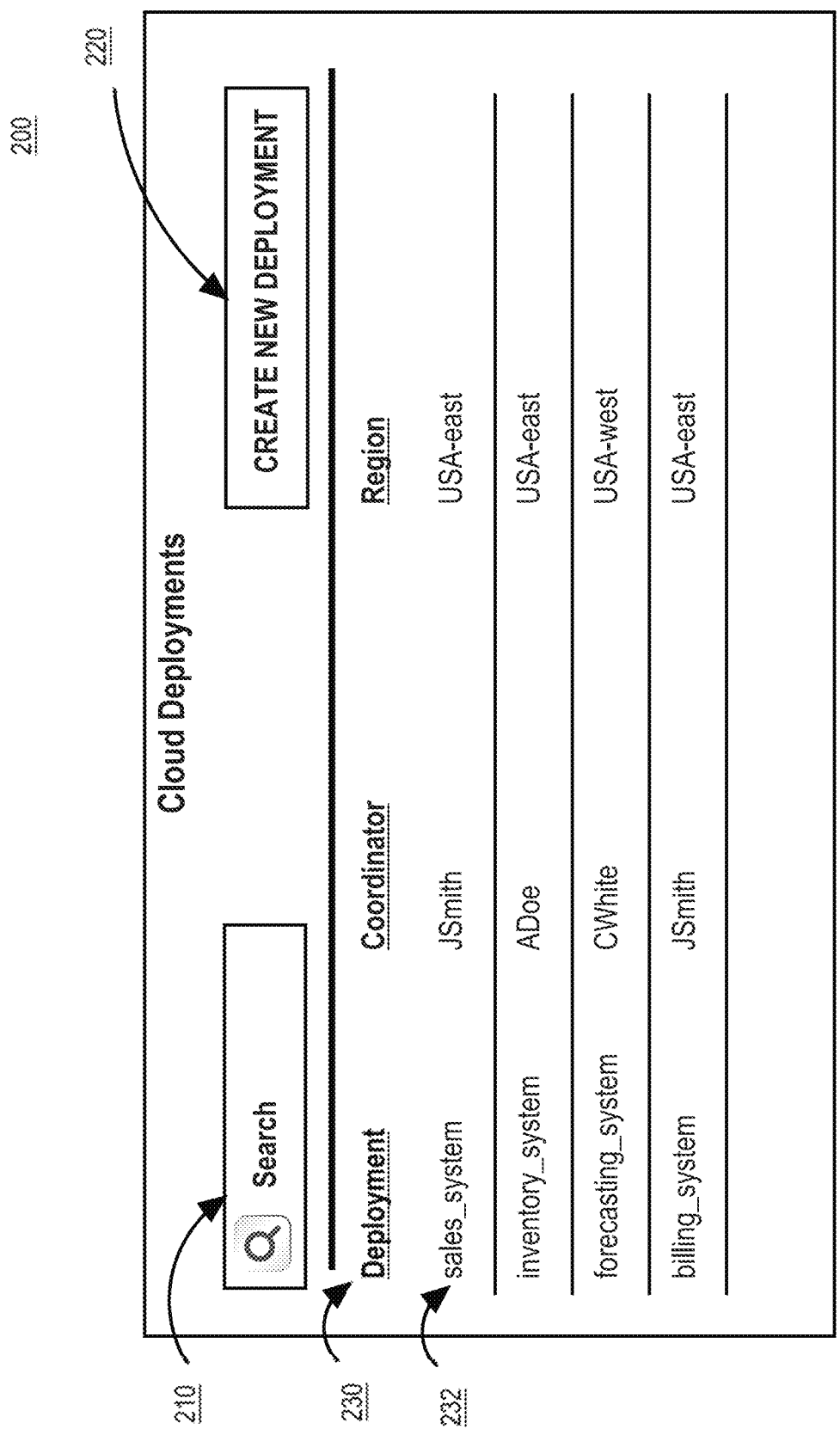
FIG. 2 illustrates an example user interface for managing a set of deployments, according to one embodiment.

FIG. 2 illustrates an example user interface 200 of GUI 110 that can be used for managing deployments via cloud computing interface system 100. User interface 200 is merely an exemplary user interface according to one embodiment, and the features may be modified or presented differently in other embodiments.

User interface 200 includes a deployment list 230 that displays the currently existing deployments that have already been deployed via cloud computing service 130. In an embodiment, the contents of deployment list 230 is limited based on user access permission settings of the user that is interacting with user interface 200. Thus, a user with limited access permissions would not be able to view deployments in deployment list 230 for which the user does not have appropriate user access permissions. The deployment list 230 is generated based on data received from cloud computing management service 120 about existing deployments.

In an embodiment, deployments list 230 may display various attributes of the deployments. In the example of user interface 200, the deployment list 230 may display information regarding attributes of the deployments including deployment name, coordinator name which represents the user that is responsible for the deployment, and region, which specifies which region the deployment is located in. The deployment list 230 may display additional attributes of the deployments in other embodiments.

User interface 200 may include a search bar 210 that can be used to search for a particular deployment from the list of deployments 230. Upon receiving a search query via search bar 210, GUI 110 is programmed or configured to perform a search on the deployment list 230 and filter out deployments from deployment list 230 that do not match the submitted search query.

In an embodiment, each row of deployment list 230 may be interacted with by a user. For example, upon receiving a user input, such as a mouse click or touch gesture, on row 232, the configuration settings for the selected deployment would be displayed.

In an embodiment, user interface 200 may include a user input 220 for creating a new deployment. In this present example, user input 220 is a button, but any other user input may be used, such as a touch gesture, mouse gesture, or other user interface input.

Figure 3A:
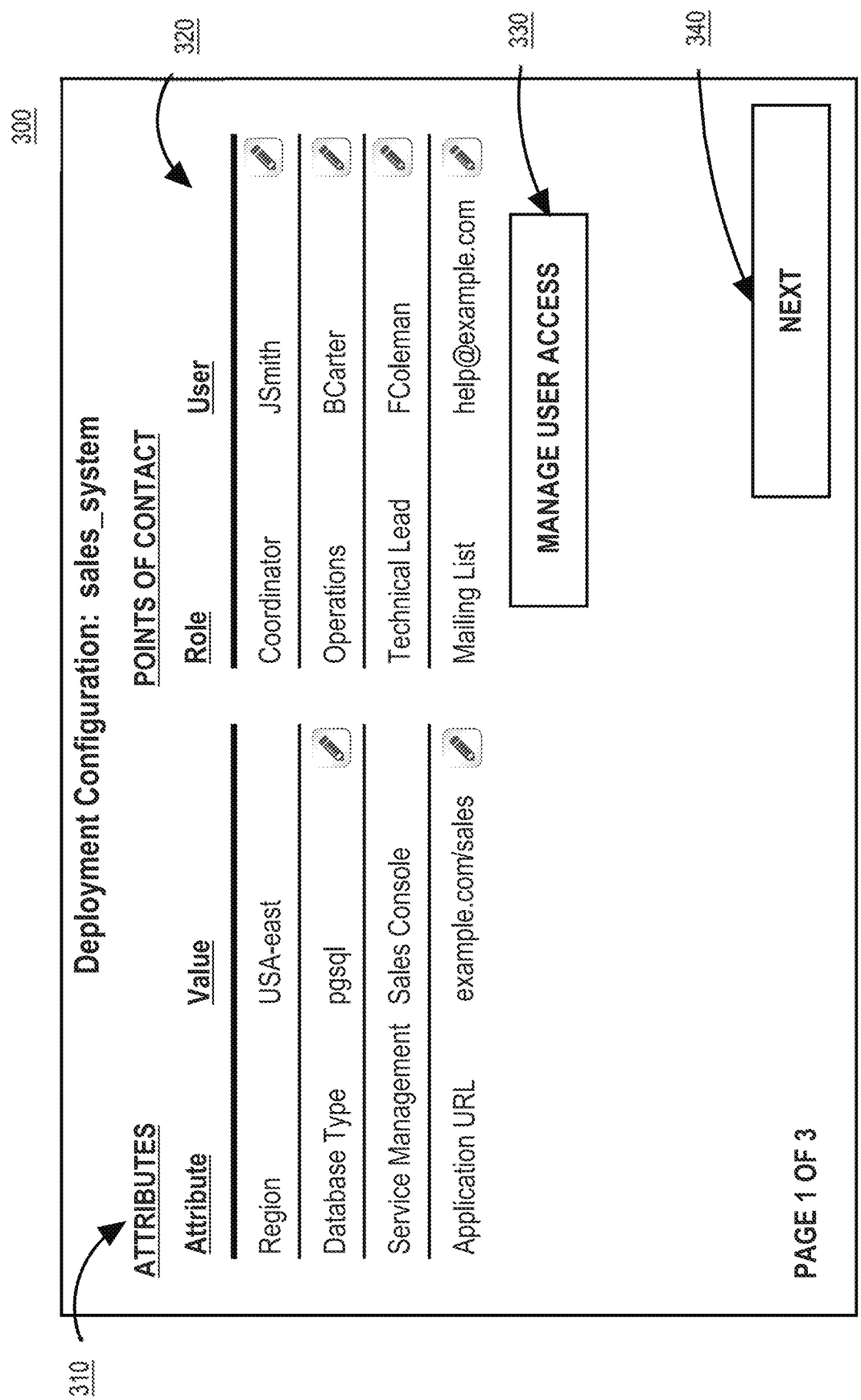
FIG. 3A, FIG. 3B, and FIG. 3C illustrate an example user interface for configuring a deployment, according to one embodiment.
Figure 3B:
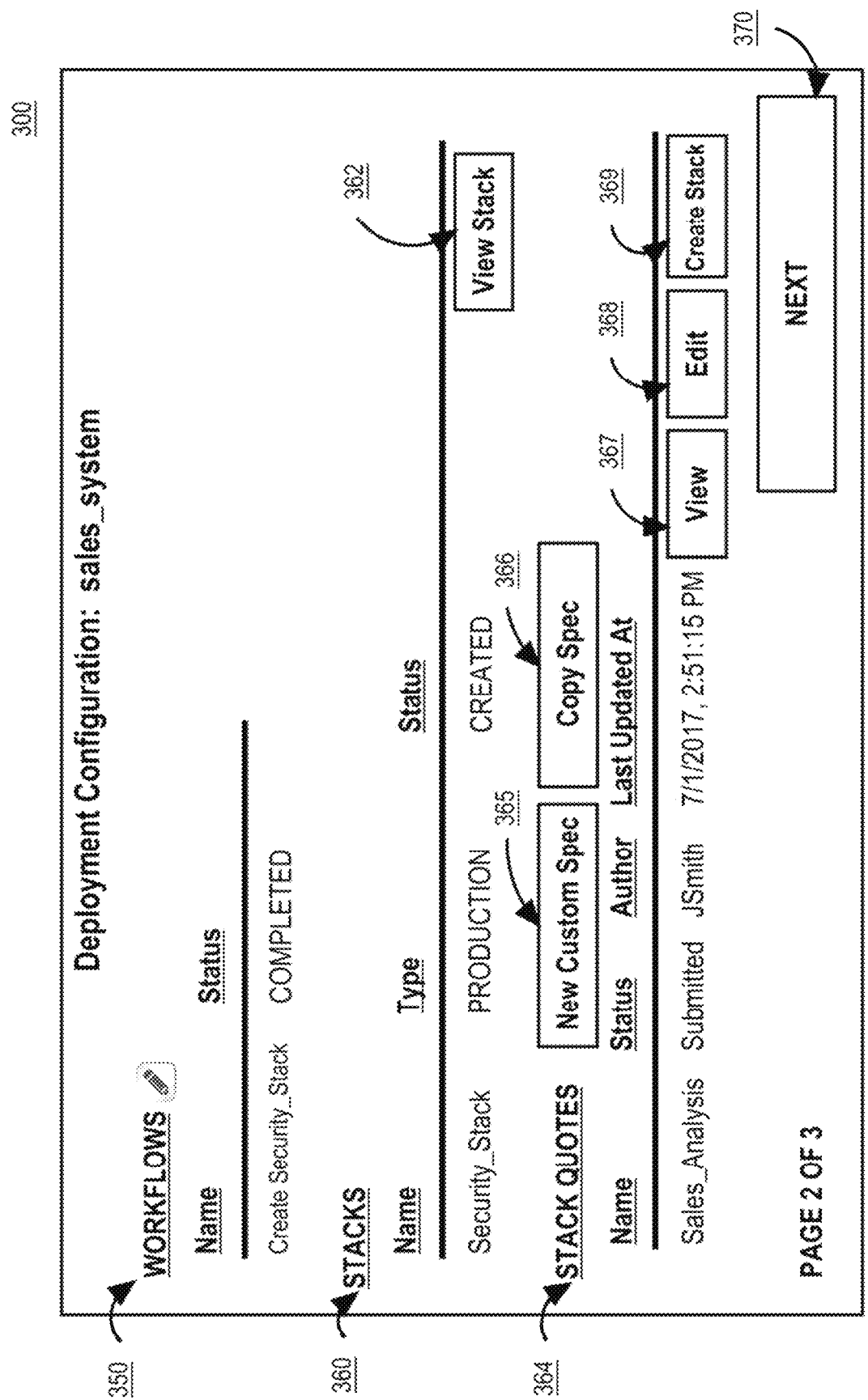
Figure 3C:
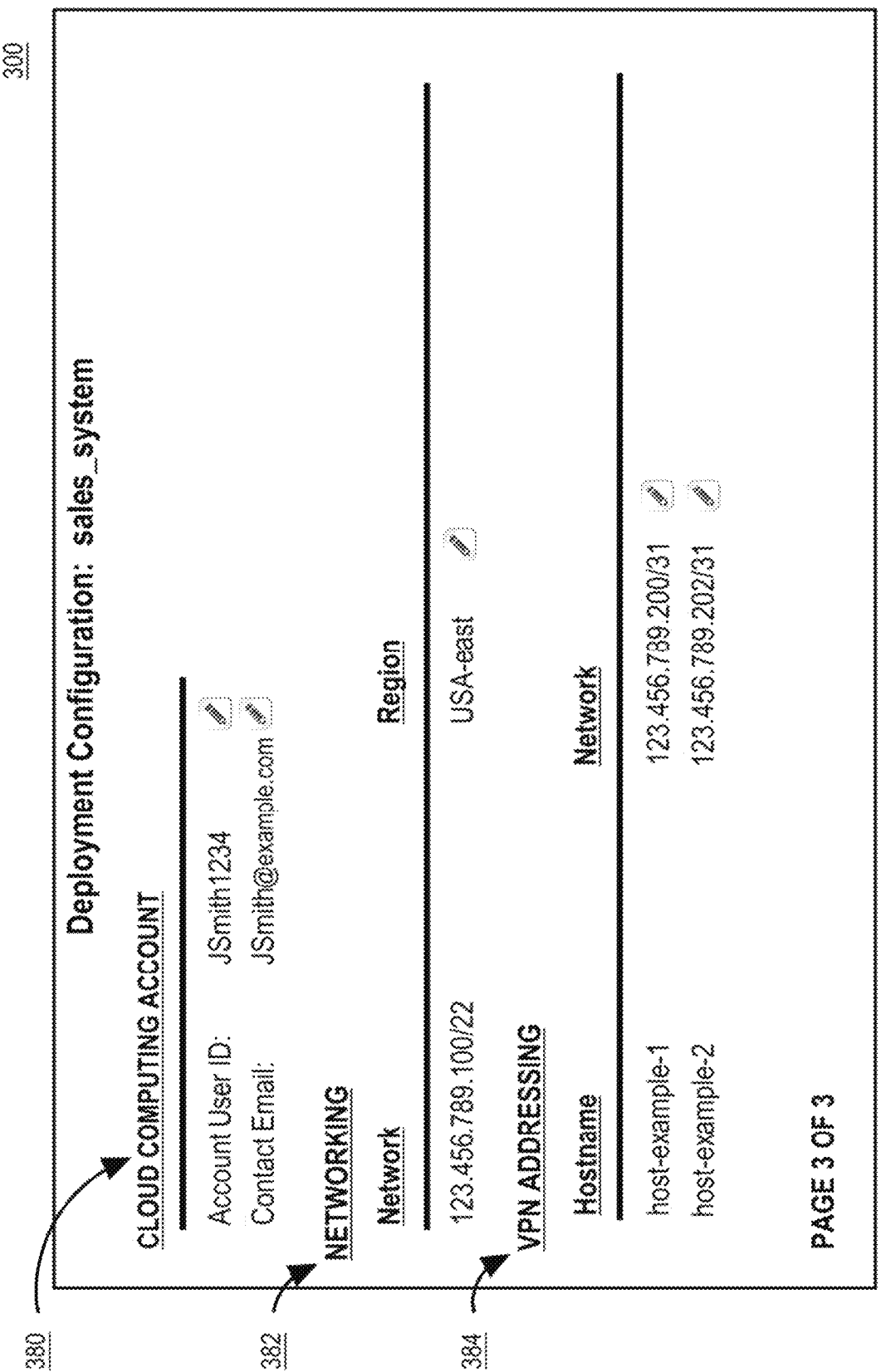

Upon selecting user input 220 for creating a new deployment, a new user interface is displayed by GUI 110 for configuring a deployment, in an embodiment. FIG. 3A, FIG. 3B, and FIG. 3C collectively show an exemplary user interface 300 for configuring a new deployment. Although depicted as three separate pages across FIG. 3A, FIG. 3B, and FIG. 3C, in other embodiments, the data displayed in user interface 300 may be displayed in a single page or some other alternative configuration.

FIG. 3A displays a user interface 300 for managing a deployment configuration. Specifically, user interface 300 displays various configuration settings that could have been used for creating the deployment for the sales system as shown in row 232 of user interface 200. In one embodiment, one or more of the configuration settings of user interface 300 may be pre-populated by one or more pre-stored configuration settings of cloud computing management service 120, while other configuration settings may represent user configuration settings that are provided by a user.

For example, user interface 300 includes a set of deployment attributes 310, including region, database type, service management console, and application URL for the sales system deployment. These attributes represent a set of configuration settings for the entire sales system deployment. Likewise, user interface 300 includes a set of point of contact configuration settings 320 that describe who is responsible for the sales system deployment, including deployment coordinator, operations lead, technical lead, and mailing list. The example configuration settings of 310 and 320 are merely exemplary, and other configuration settings for the deployment may be used in other embodiments. In some embodiments, the configuration settings of 310 and 320 may use default pre-stored configuration settings for the deployment. In another embodiment, the configuration settings of 310 and 320 may be copied from an existing specification that was previously used. One or more of the configuration settings of 310 and 320 may be editable via user input received via GUI 110. Thus, the present system allows for quick and efficient initialization of the configuration settings of a deployment, while still allowing a user to customize aspects of the deployment as necessary.

In an embodiment, user interface 300 may include a user input 330 for opening a new user interface for managing user access to the deployment. User interface 300 may include a navigation user input 340 to navigate to the next page of user interface 300.

In FIG. 3B, the second page of user interface 300 is displayed. User interface 300 includes workflows list 350 which displays one or more workflows in progress for the selected deployment. In this particular example, a single workflow for "Create Security Stack" is listed with a status of COMPLETED. A workflow describes a set of tasks that may be automatically executed by cloud computing management service 120 to achieve a goal and thus, a workflow can be used to assist a user in preparing a deployment. A task may define a set of programming instructions for allocating, provisioning, configuring, or deploying a software instance or deployment. An example of a workflow will be discussed herein. Workflows list 350 may be edited to add additional workflows for completion by the user. A workflow thus represents one set of pre-stored configuration settings that can be programmed or configured to allocate, provision, configure, or deploy a deployment.

In an embodiment, user interface 300 may include a stacks list 360 that displays details regarding stacks for the deployment that have already been deployed to the cloud computing service 130. In an embodiment, various attributes of the stack may be displayed in stacks list 360 so that a user can monitor the status of the stacks. In one embodiment, the attributes of the stack may be stored by the cloud computing management service 120, but in other embodiments, one or more of the attributes may be obtained by the cloud computing management service 120 by sending a query to the cloud computing service 130 and receiving a response with the values for the attributes representing the status of the deployed stacks in the deployment. User input 362 may be used to view the stack and/or the configuration settings for the stack.

In an embodiment, user interface 300 may include a stack quotes list 364 that provides details regarding attributes of stacks specified in specifications that are still being configured and that have not been deployed yet. For example, stack quotes list 364 includes a single entry for a "Sales Analysis" stack that has not been deployed yet. Thus the "Sales Analysis" row of stack quotes list 364 represents the status of a specification for a particular stack deployment. The stack quotes list 364 may display user input 367, 368, and/or 369 for working with the existing stack. User input 367 allows a user to view the configuration settings for the given stack. User input 368 allows a user to edit the configuration settings for the given stack. User input 369 allows a user to initiate the deployment, allocation, and/or provisioning of the stack associated with the specification of a given row.

Stack quotes list 364 further includes user input 365 for creating a new custom specification for a new stack. Stack quotes list 364 additionally may include user input 366 for creating a new specification based on copying an existing specification. Thus, user inputs 365 and 366 provides two different techniques for initializing and configuring a specification, based on either default settings or based on another specification, respectively.

User input 370 may be used to navigate to the next page of the user interface 300.

In FIG. 3C, the third page of user interface 300 is displayed. User interface 300 includes cloud computing account display 380. Cloud computing account display 380 may include one or more configuration settings for the cloud computing account that is to be used to access cloud computing service 130 for this deployment. User interface 300 further includes networking display 382 that includes one or more configuration settings for the networking settings to be used by the deployment. User interface 300 may further include Virtual Private Networking (VPN) display 384 that includes one or more configuration settings for VPN addressing for the various hosts in the deployment.

The configuration settings of cloud computing account display 380, networking display 382, and VPN display 384 thus represent exemplary configuration settings to be used in configuring the deployment. In a typical deployment, dozens or hundreds of similar configuration settings may be included in user interface 300. The configuration settings may be a combination of pre-stored configuration settings stored in cloud computing management service 120 and user configuration settings provided by GUI 110. The configuration settings may be stored in a specification that is associated with the deployment. A user can revise and edit some of the configuration settings via user interface 300, and such changes are reflected in the underlying specification. However, other settings may be unmodifiable to prevent user error in modifying them. For example, certain security configuration settings, compliance configuration settings, or the best practice settings may be unmodifiable by a user.

The present system thus provides a convenient way to initialize a deployment's configuration settings, particularly for important and technical configuration settings related to security, networking, VPN, stack management, cloud computing accounts, and other features of a deployment. The present system provides pre-stored configuration settings for many of these configuration settings thus allowing non-technical users to easily initialize a new deployment using appropriate security and compliance protocols as specified in the pre-stored configuration settings. Furthermore, the user may customize these configuration settings for the deployment via the user interface 300 as needed for a particular deployment, thereby providing flexibility in configuring deployments.

2.3 Stack Configuration

Figure 4:
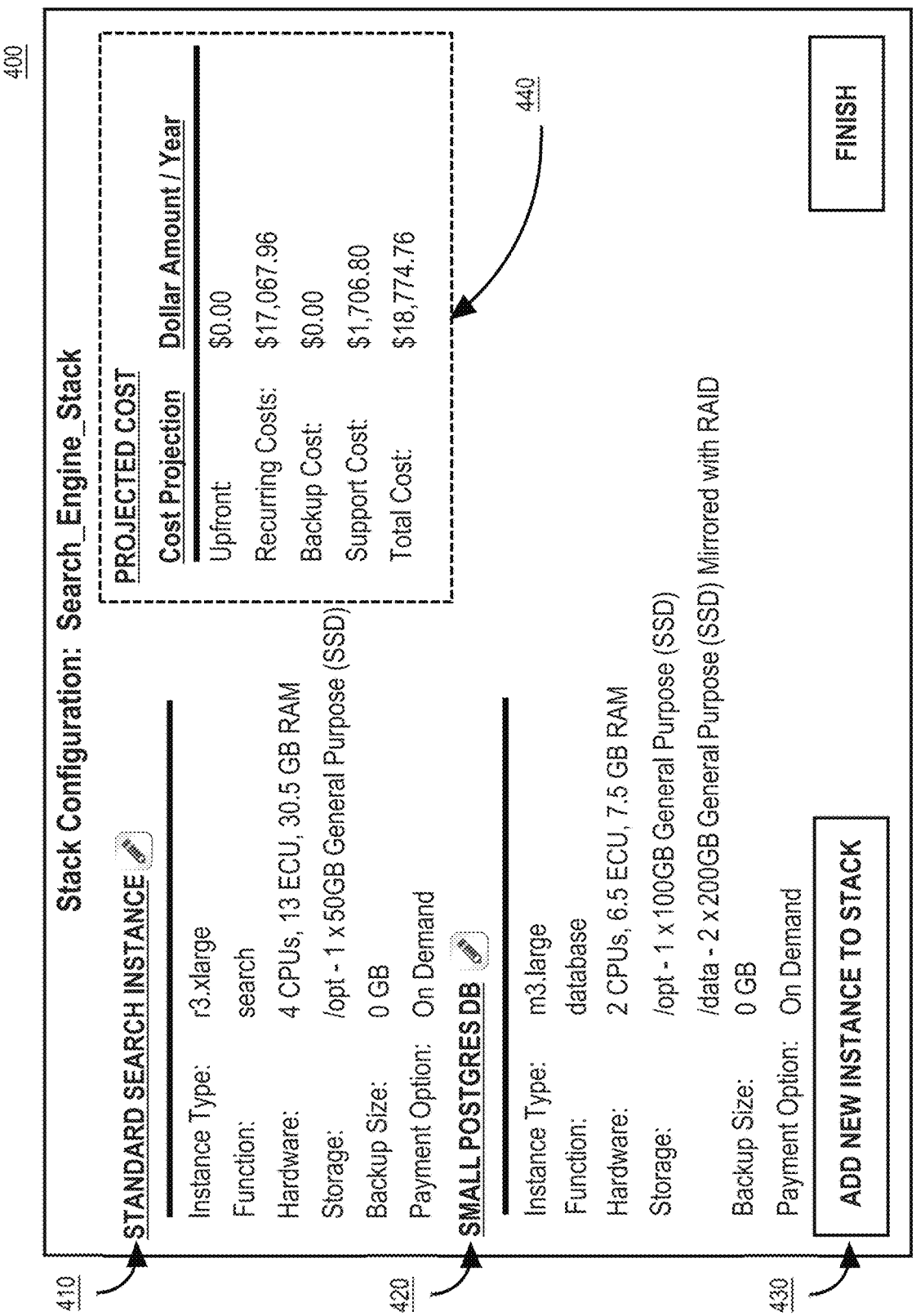
FIG. 4 illustrates an example user interface for configuring a stack, according to one embodiment.

FIG. 4 illustrates an example user interface 400 for configuring a stack. User interface 400 includes instance fields 410 and 420. Instance fields 410 and 420 provide a preview of the configuration settings for the software instances specified in the specification for the stack that is being configured. In this example, instance fields 410 and 420 correspond to the standard search instance and postgres database specified in Table A. The content of the instance fields 410 and 420 thus displays the current values of the configuration settings for the respective software instances. In an embodiment, the configuration settings for the instance fields 410 and 420 may be modified by a user via GUI 110. Thus, the configuration settings for the instance fields 410 and 420 may represent a combination of pre-stored configuration settings and user configuration settings.

User input 430 may be used to add configuration settings for a new software instance to the existing stack. Further information regarding instance configuration will be described herein.

Projected cost display 440 displays the quote generated by quote generator 128. In an embodiment, projected cost display 440 may be updated in real-time as the various configuration settings of the stack are modified. Thus, projected cost display 440 displays data that can be helpful to a user to decide how to configure a stack and/or its software instances.

2.4 Instance Configuration

Figure 5:
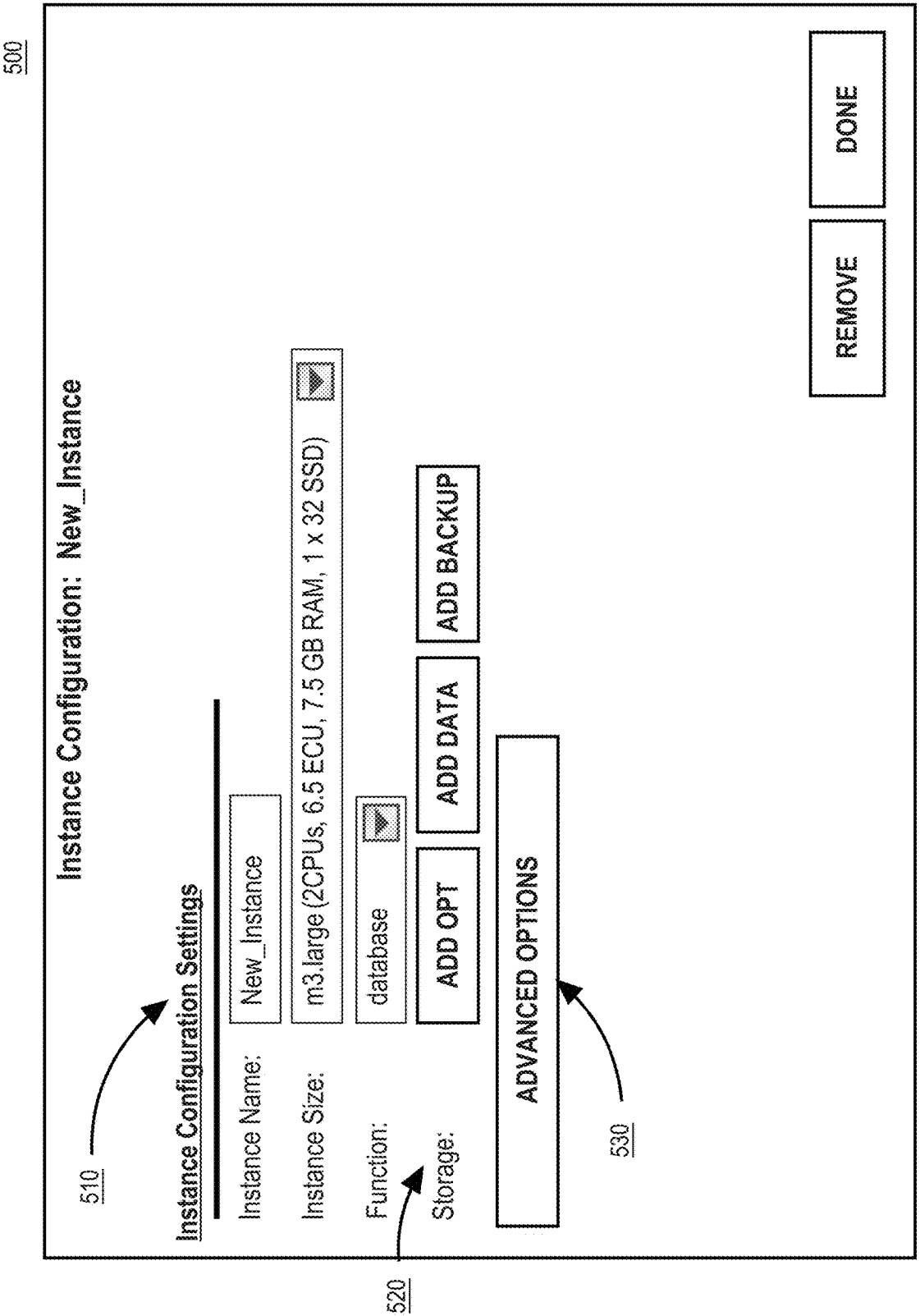
FIG. 5 illustrates an example user interface for configuring an instance, according to one embodiment.

FIG. 5 illustrates an example user interface 500 for configuring an instance. User interface 500 includes instance configuration settings 510 which may include one or more configuration settings for the instance. In one embodiment, some of the configuration settings of instance configuration settings 510 may be selected from a dropdown menu of commonly-used values based on pre-stored configuration setting. For example, the "Function" configuration setting allows a user to select the appropriate function for the instance, such as security, database, application server, or any other commonly used instance type. The function correlates to a pre-stored function definition in function definition library 124. The cloud computing management service 120 can thus use a preexisting function definition to provide configuration settings for the specification of the instance. The use of function definitions thereby ensures that the configuration of the instance is initialized based on prior pre-stored configuration settings for similar types of instances in other deployments.

In an embodiment, some configuration settings for a particular instance are not displayed to a user at all. For example, certain security protocols 122 may include technical networking settings for a software instance that are unable to be modified by a user so as to ensure that the software instance is deployed according to security best practices as defined in the security protocol 122. This ensures that the software instance is secure, in addition to easily configured.

User interface 500 may include a user input 530 for accessing certain advanced options. The advanced options may include any configuration settings that a typical user would not need to modify. For example, the configuration settings for the backup size and payment option displayed in FIG. 4 may be hidden behind advanced options user input 530 because such configuration settings are not frequently modified.

2.5 Quote Generation

The projected cost display 440 of user interface 400 may show a cost projection for the deployment of a stack. The projected cost is generated based on a quote.

Quote generator 128 is programmed or configured to generate a quote for display in projected cost display 440 based on a specification. In one embodiment, whenever a specification is modified, quote generator 128 may send a request to cloud computing service for a quote for the modified specification. For example, the quote generator 128 may send the request to cloud computing service for a quote via an Application Programming Interface (API) for a given specification. Cloud computing service 130 may then use the provided specification to generate a quote that comprises various cost projections which may include an upfront cost, a recurring cost, a backup cost, a support cost, and/or a total cost. Cloud computing service 130 may then send the quote to quote generator 128. Quote generator 128 may then use the quote to display a projected cost display 440 in user interface 400 for the current configuration of stack. This system thus allows a user to view, in real-time, the projected cost of a particular configuration of a stack of software instances.

In another embodiment, quote generator 128 is programmed or configured to generate a quote for display in projected cost display 440 by sending a request for pricing information to cloud computing service 130 via an API. In an embodiment, the pricing information returned by cloud computing service 130 may be generic and not specific to the specification. Quote generator 128 may then parse the received pricing information and combine it with the specification to generate a quote for the specification.

In another embodiment, quote generator 128 is programmed or configured to generate a quote for a specification by scraping a website associated with cloud computing service 130 for pricing information based on the specification. For example, in one embodiment, quote generator 128 is programmed or configured to scrape JavaScript file(s) for a website associated with cloud computing service 130 for pricing information. Quote generator 128 may send a request to a website containing pricing information over an API, and may extract and parse the pricing information for the particular configuration settings of the specification. The pricing information may include pricing information for different configurations of a computing device by cloud computing service 130. Quote generator 128 can then use the scraped pricing information to compile a quote for the specification.

2.6 Deploying to a Cloud Computing Service

Returning to FIG. 3, once a user has finished configuring a specification for a new stack, they may then create the stack. For example, a user may select the user input 369 to create a stack based on the specification. Cloud computing management service 120 will then send a request to cloud computing service 130 to allocate, provision, and/or deploy the stack according to the specification. In one embodiment, cloud computing management service 120 sends a request to cloud computing service 130 that includes part or all of the specification. In another embodiment, the specification itself is not readable by the cloud computing service 130, thus cloud computing management service 120 is programmed or configured to translate the contents of the specification into one or more API calls and/or host-level commands that can be used to deploy, allocate, and/or provision the stack according to the specification. In an embodiment, these API calls and/or host-level commands may include commands to setup storage on the host (e.g., storage format, mount, encryption, and other storage characteristics), provision the host (e.g. installation of packages, security tooling, configuration management, and other provisioning tasks), and any other commands necessary for allocating, provisioning, configuring, or deploying a stack to a cloud computing device. The API calls and/or host-level commands may then be sent by cloud computing management service 120 to cloud computing service 130, via one or more requests, in order to allocate, provision, and/or deploy the stack according to the specification. In an embodiment, cloud computing management service 120 is programmed or configured to coordinate the API calls and/or host-level commands sent to cloud computing service 130. For example, cloud computing management service 120 may be programmed or configured to determine which subnets to launch software instances to, to determine which base image to use for deployment, to ensure that API requests to cloud computing service 130 are rate-limited to avoid being throttled, to request necessary storage on the cloud computing device(s), and other coordination responsibilities to ensure that the stack(s) are correctly allocated, provisioned, configured, and/or deployed while adhering to the specification.

In response, cloud computing service 130 will allocate, provision, and or deploy the stack on one or more cloud computing devices 140 in accordance with the specification. Cloud computing service 130 can send a status of the stack to the cloud computing management service 120, such as whether the stack was successfully deployed or not. User interface 300 can then use this information to update the stacks list 360 with the status of the newly deployed stack, thus allowing a user to easily see if the stack was successfully deployed or not.

2.7 Workflows

A workflow is a description of a set of tasks that to allocate, configure, provision, manage, and/or deploy a deployment, stack, or instance. A user may view the workflow via workflow list 350 to assist them in the configuration process. By selecting a workflow from workflow list 350, the workflow user interface 600 of FIG. 6 is displayed.

Workflow user interface 600 includes a task list 610 that identifies a set of commonly performed tasks for a particular workflow. A workflow definition may be retrieved from workflow library 129. A workflow definition defines the programmatic instructions for each task of a workflow. For example, a workflow definition may identify particular function calls, method calls, sequences of programming instructions, scripts, processes, API calls, host-level commands, and any other programs or instructions for executing tasks associated with the workflow. For example, one workflow may relate to modifying a stack and may include tasks related to adding or removing hosts, changing instance types of an instance, modifying storage, etc. As another example, another workflow may relate to creating a new stack, and may include tasks related to configuring hosts, allocating storage, deploying software instances of the stack onto cloud computing devices, etc. Cloud computing management service 120 is thus programmed or configured to use a workflow definition to automatically execute the various tasks of a workflow, thereby automating the commonly performed tasks. Some tasks in a workflow definition may require direct execution of a set of programming instructions by cloud computing management service 120, but other tasks in a workflow definition may require execution of a set of programming instructions via an API call or host-level command between cloud computing management service 120 and cloud computing service 130.

Task list 610 may identify each task in the workflow, as determined from the workflow definition, as well as the status of the task. In an embodiment, execution of task in a workflow is automated by cloud computing management service 120. Cloud computing management service 120 may thus automatically execute each task in a workflow to achieve a goal related to allocating, provisioning, configuring, or deploying a software instance or stack. In one embodiment, the status of each task may be updated automatically based on the user interactions with cloud computing management service 120, but in another embodiment, the tack may be updated manually by a user by interacting with task list 610 via one or more user inputs (not displayed).

Workflow user interface 600 thus provides pre-stored task lists that assists a user in performing the necessary steps for configuring a deployment, a stack, and/or a software instance. The workflow thus simplifies the configuration process for the user.

3.0 Example Process and Algorithm

Figure 7:
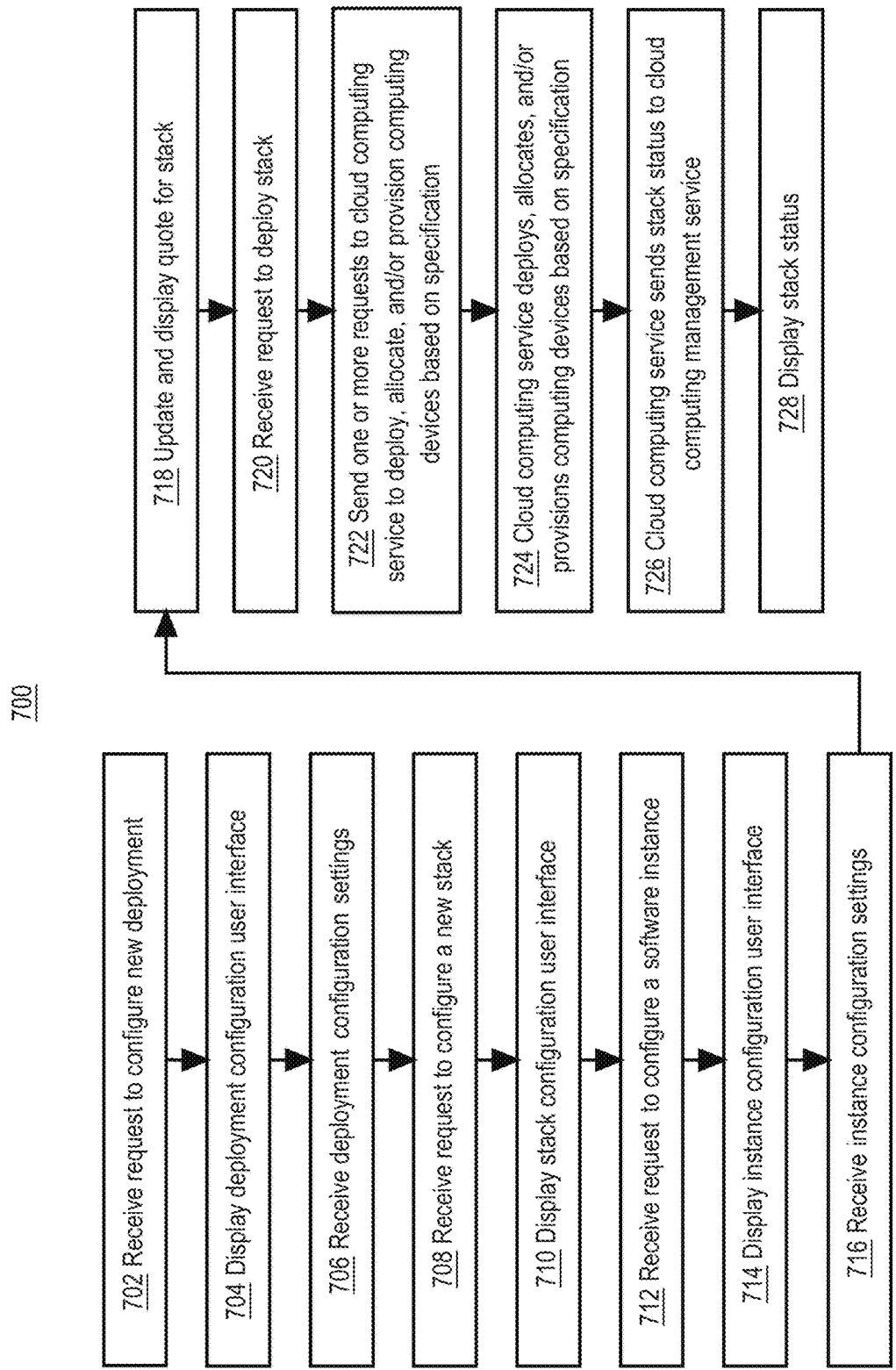
FIG. 7 illustrates a flow diagram for a process of configuring and deploying a deployment to a cloud computing service, according to one embodiment.

FIG. 7 illustrates a flow diagram of an example process 700 of cloud computing interface system 100 for configuring and deploying a deployment to a cloud computing service 130, according to one embodiment.

FIG. 7 is intended to disclose an algorithm or functional description that may be used as a basis of writing computer programs to implement the functions that are described herein and which cause a computer to operate in the new manner that is disclosed herein. Further, FIG. 7 is provided to communicate such an algorithm at the same level of detail that is normally used, by persons of skill in the art to which this disclosure is directed, to communicate among themselves about plans, designs, specifications and algorithms for other computer programs of a similar level of complexity.

Process 700 begins at step 702. In step 702, cloud computing management service 120 receives a request, via GUI 110 to configure a new deployment. For example, the request may be generated by GUI 110 in response to the selection of user input 220 in FIG. 2. The process 700 may then proceed to step 704.

In step 704, cloud computing management service 120 causes to be displayed on GUI 110 a deployment configuration user interface. For example, user interface 300 of FIGS. 3A, 3B, and 3C may be displayed. In one embodiment, one or more configuration settings for the deployment may be displayed based on pre-stored configuration settings stored by cloud computing management service 120. The process 700 may then proceed to step 706.

In step 706, cloud computing management service 120 receives one or more user configuration settings from GUI 110 for the deployment. In an embodiment, cloud computing management service 120 may store these received configuration settings, for example, in a specification for the deployment. The process 700 may then proceed to step 708.

In step 708, cloud computing management service 120 receives a request, via GUI 110, to configure a new stack for the deployment. For example, the request may be generated by GUI 110 in response to the selection of either user input 365 or user input 366 in FIG. 3B. By selecting user input 365, a user may create a new custom specification that may be built off of one or more generic pre-stored configuration settings. By selecting user input 366, a user may create a specification based on copying an existing specification. The process 700 may then proceed to step 710.

In step 710, cloud computing management service 120 causes to be displayed, via GUI 110, a stack configuration user interface. For example, user interface 400 of FIG. 4 is an example stack configuration user interface. In an embodiment, the cloud computing management service 120 may store one or more default pre-stored configuration settings for the stack in the specification at this time. The process 700 may then proceed to step 712.

In step 712, cloud computing management service 120 receives a request to configure a software instance for the stack from GUI 110. For example, the request may be generated based on user interaction with user input 430. The process 700 may then proceed to step 714.

In step 714, cloud computing management service 120 causes GUI 110 to display an instance configuration user interface. User interface 500 in FIG. 5 illustrates an example instance configuration user interface. In an embodiment, one or more of the configuration settings of user interface 500 may include pre-stored configuration settings. The process 700 may then proceed to step 716.

In step 716, cloud computing management service 120 receives one or more user configuration settings for the instance that is being configured via GUI 110. In an embodiment, a user may select a function definition from a list of available functions defined in function library 124. The function is associated with a set of pre-stored configuration settings that should be used. In response to receiving the user configuration settings, the specification is updated with the new configuration setting values. The process 700 may then proceed to step 718.

In step 718, quote generator 128 is programmed or configured to generate a quote based on the specification. In one embodiment, quote generator 128 generates a quote in real-time whenever the underlying specification is updated or modified. In one embodiment, quote generator 128 generates a quote by sending a request to cloud computing service 130 that is based, at least in part, on the specification. For example, cloud computing service 130 may send one or more API calls to cloud computing service 130, based on the specification, to generate a quote. The cloud computing service 130 will return the quote or pricing information that may be used to generate a quote to the quote generator 128. Cloud computing management service 120 uses the receiving information to generate a quote and display a projected cost for the stack. The process 700 may then proceed to step 720.

In step 720, cloud computing management service 120 is programmed or configured to receive a request to deploy a stack from GUI 110. For example, such a request may be generated by user input 369 in FIG. 3B. The process 700 may then proceed to step 722.

In step 722, cloud computing management service 120 is programmed to send one or more request(s) to cloud computing service 130 to deploy, allocate, and/or provision one or more computing devices based on the specification. In one embodiment, cloud computing management service 120 is programmed or configured to send a request that includes part or all of the specification to cloud computing service 130. In another embodiment, cloud computing management service 120 is programmed or configured to translate the specification into one or more API calls and/or host-level calls to deploy, allocate, configure, and/or provision one or more computing devices based on the specification. Cloud computing management service 120 is further programmed or configured to send the one or more API calls and/or host-level calls as one or more requests to cloud computing service 130. The process 700 may then proceed to step 724.

In step 724, in response to the request(s) sent in step 722, cloud computing service 130 is programmed or configured to deploy, allocate, and/or provision one or more stacks on one or more cloud computing devices 140 based on the configuration settings specified in the specification. The process 700 may then proceed to step 726.

In step 726, cloud computing service 130 is programmed or configured to send a stack status to cloud computing management service 120 for the status of the deployment. The process 700 may then proceed to step 728.

In step 728, cloud computing management service 120 is programmed or configured to cause GUI 110 to display the status of the deployment of the stack based on the stack status received in step 726. For example, the stack status may be displayed in stack list 360 of FIG. 3B. The process 700 may then end.

4.0 Implementation Mechanisms—Hardware Overview

Figure 8:
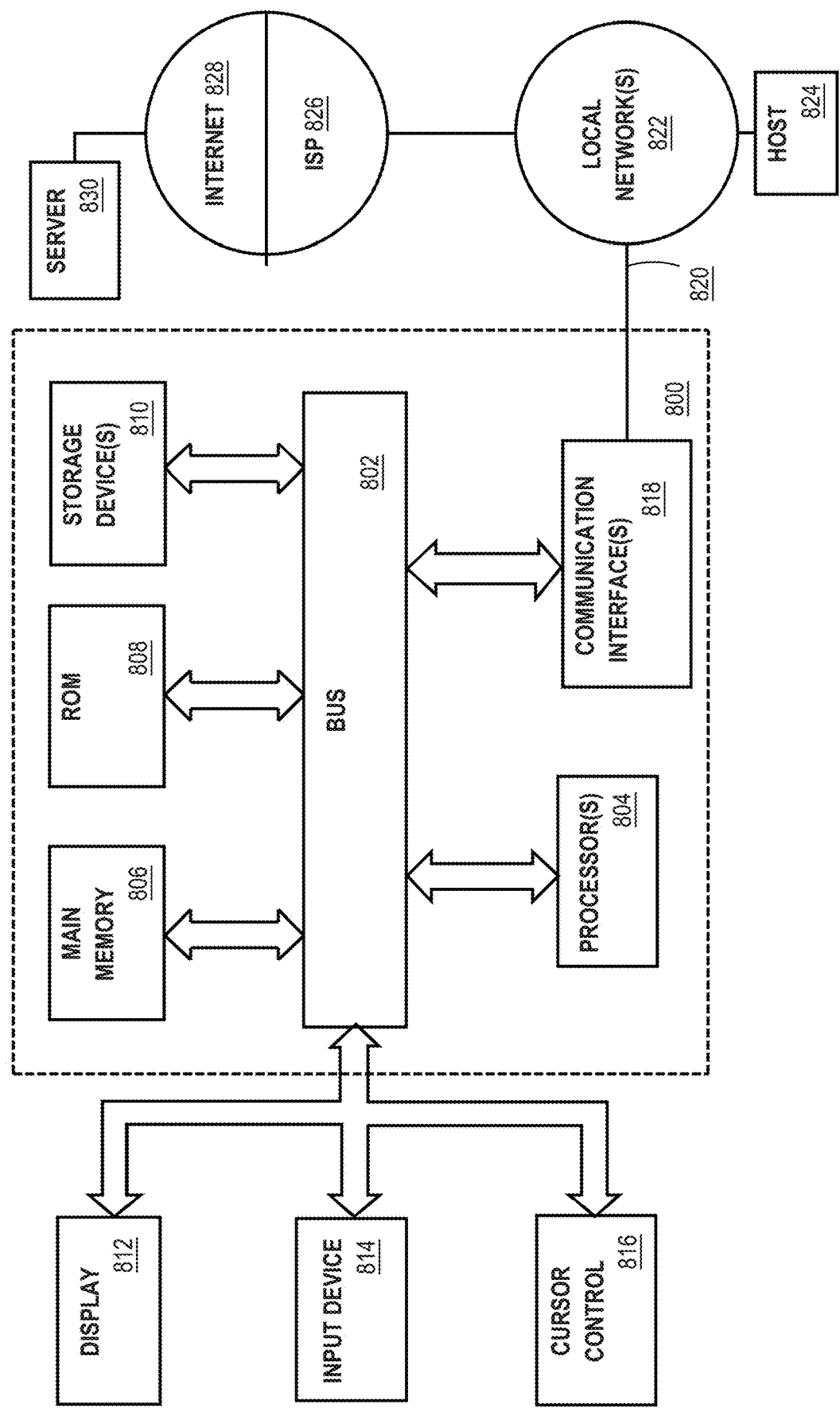
FIG. 8 is a block diagram of a computing device in which the example embodiment(s) of the present invention may be embodied.

Referring now to FIG. 8, it is a block diagram that illustrates a computing device 800 in which the example embodiment(s) of the present invention may be embodied. Computing device 800 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 800 may include a bus 802 or other communication mechanism for addressing main memory 806 and for transferring data between and among the various components of device 800.

Computing device 800 may also include one or more hardware processors 804 coupled with bus 802 for processing information. A hardware processor 804 may be a general purpose microprocessor, a system on a chip (SoC), or other processor.

Main memory 806, such as a random access memory (RAM) or other dynamic storage device, also may be coupled to bus 802 for storing information and software instructions to be executed by processor(s) 804. Main memory 806 also may be used for storing temporary variables or other intermediate information during execution of software instructions to be executed by processor(s) 804.

Software instructions, when stored in storage media accessible to processor(s) 804, render computing device 800 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 800 also may include read only memory (ROM) 808 or other static storage device coupled to bus 802 for storing static information and software instructions for processor(s) 804.

One or more mass storage devices 810 may be coupled to bus 802 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 810 (e.g., the main hard disk for the device) stores a body of program and data for directing operation of the computing device, including an operating system, user application programs, driver and other support files, as well as other data files of all sorts.

Computing device 800 may be coupled via bus 802 to display 812, such as a liquid crystal display (LCD) or other electronic visual display, for displaying information to a computer user. In some configurations, a touch sensitive surface incorporating touch detection technology (e.g., resistive, capacitive, etc.) may be overlaid on display 812 to form a touch sensitive display for communicating touch gesture (e.g., finger or stylus) input to processor(s) 804.

An input device 814, including alphanumeric and other keys, may be coupled to bus 802 for communicating information and command selections to processor 804. In addition to or instead of alphanumeric and other keys, input device 814 may include one or more physical buttons or switches such as, for example, a power (on/off) button, a "home" button, volume control buttons, or the like.

Another type of user input device may be a cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

While in some configurations, such as the configuration depicted in FIG. 8, one or more of display 812, input device 814, and cursor control 816 are external components (i.e., peripheral devices) of computing device 800, some or all of display 812, input device 814, and cursor control 816 are integrated as part of the form factor of computing device 800 in other configurations.

Functions of the disclosed systems, methods, and modules may be performed by computing device 800 in response to processor(s) 804 executing one or more programs of software instructions contained in main memory 806. Such software instructions may be read into main memory 806 from another storage medium, such as storage device(s) 810. Execution of the software instructions contained in main memory 806 cause processor(s) 804 to perform the functions of the example embodiment(s).

While functions and operations of the example embodiment(s) may be implemented entirely with software instructions, hard-wired or programmable circuitry of computing device 800 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more software instructions to processor(s) 804 for execution. For example, the software instructions may initially be carried on a magnetic disk or solid-state drive of a remote computer. The remote computer can load the software instructions into its dynamic memory and send the software instructions over a telephone line using a modem. A modem local to computing device 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor(s) 804 retrieves and executes the software instructions. The software instructions received by main memory 806 may optionally be stored on storage device(s) 810 either before or after execution by processor(s) 804.

Computing device 800 also may include one or more communication interface(s) 818 coupled to bus 802. A communication interface 818 provides a two-way data communication coupling to a wired or wireless network link 820 that is connected to a local network 822 (e.g., Ethernet network, Wireless Local Area Network, cellular phone network, Bluetooth wireless network, or the like). Communication interface 818 sends and receives electrical, electromagnetic, or optical signals that carry digital data streams representing various types of information. For example, communication interface 818 may be a wired network interface card, a wireless network interface card with an integrated radio antenna, or a modem (e.g., ISDN, DSL, or cable modem).

Network link(s) 820 typically provide data communication through one or more networks to other data devices. For example, a network link 820 may provide a connection through a local network 822 to a host computer 824 or to data equipment operated by an Internet Service Provider (ISP) 826. ISP 826 in turn provides data communication services through the world wide packet data communication network now commonly referred to as the "Internet" 828. Local network(s) 822 and Internet 828 use electrical, electromagnetic or optical signals that carry digital data streams. The signals through the various networks and the signals on network link(s) 820 and through communication interface(s) 818, which carry the digital data to and from computing device 800, are example forms of transmission media.

Computing device 800 can send messages and receive data, including program code, through the network(s), network link(s) 820 and communication interface(s) 818. In the Internet example, a server 830 might transmit a requested code for an application program through Internet 828, ISP 826, local network(s) 822 and communication interface(s) 818.

The received code may be executed by processor 804 as it is received, and/or stored in storage device 810, or other non-volatile storage for later execution.

5.0 Implementation Mechanisms—Software Overview

Figure 9:
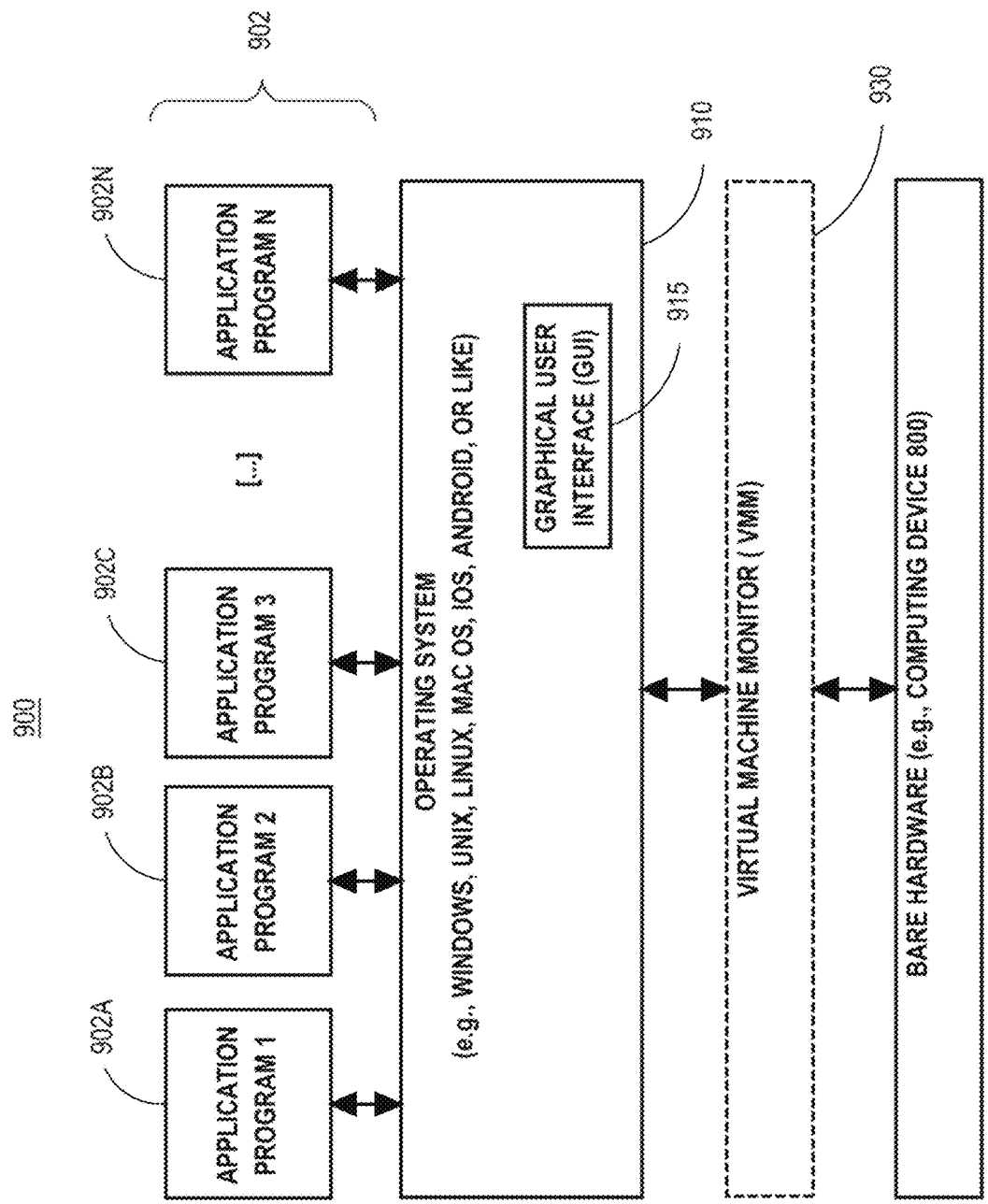
FIG. 9 is a block diagram of a software system for controlling the operation of the computing device.

FIG. 9 is a block diagram of a software system 900 that may be employed for controlling the operation of computing device 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computing device 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 900. The applications or other software intended for use on device 900 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of device 800. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the device 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of device 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

6.0 Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
generating, by an intermediary system, a specification that includes system-provided configuration settings for a software deployment to at least one cloud computing service;
updating, by the intermediary system, the specification with user-provided configuration settings;
parsing generic pricing information received from an application programming interface of the at least one cloud computing service to generate parsed pricing information;
combining the parsed pricing information with the specification to generate a quote for the specification;
coordinating, after generating the quote, the software deployment, according to the specification, by sending host-level commands to the at least one cloud computing service;
wherein each of the host-level commands is programmed to cause the at least one cloud computing service to configure one or more computing devices in the at least one cloud computing service,
wherein the method is performed using one or more processors.

2. The method of claim 1, wherein the system-provided configuration settings include default pre-stored configuration settings.

3. The method of claim 2, wherein the default pre-stored configuration settings include at least one of security configuration settings or compliance configuration settings.

4. The method of claim 1, wherein the system-provided configuration settings include configuration settings from an existing specification.

5. The method of claim 1, wherein the coordinating the software deployment comprises translating, by the intermediary system, contents of the specification into the host-level commands, wherein the host-level commands are compatible with the at least one cloud computing service.

6. The method of claim 1, wherein the host-level commands include at least one of allocation commands, provisioning commands, or deployment commands.

7. The method of claim 1, further comprising:
using, by the intermediary system, the specification to parse at least one website associated with the at least one cloud computing service to thereby extract pricing information for the specification from the at least one website;
generating, by the intermediary system, a second quote using the pricing information extracted from the at least one website, wherein the second quote is for configuring the one or more computing devices in the at least one cloud computing service described in the specification.

8. One or more non-transitory computer-readable media storing instructions, which when executed by one or more processors cause:

generating, by an intermediary system, a specification that includes system-provided configuration settings for a software deployment to at least one cloud computing service;

updating, by the intermediary system, the specification with user-provided configuration settings;

parsing generic pricing information received from an application programming interface of the at least one cloud computing service to generate parsed pricing information;

combining the parsed pricing information with the specification to generate a quote for the specification;

coordinating, after generating the quote, the software deployment, according to the specification, by sending host-level commands to the at least one cloud computing service, wherein each of the host-level commands is programmed to cause the at least one cloud computing service to configure one or more computing devices in the at least one cloud computing service.

9. The one or more non-transitory computer-readable media of claim 8, wherein the system-provided configuration settings include default pre-stored configuration settings.

10. The one or more non-transitory computer-readable media of claim 9, wherein the default pre-stored configuration settings include at least one of security configuration settings or compliance configuration settings.

11. The one or more non-transitory computer-readable media of claim 8, wherein the system-provided configuration settings include configuration settings from an existing specification.

12. The one or more non-transitory computer-readable media of claim 8, wherein the coordinating the software deployment comprises translating, by the intermediary system, contents of the specification into the host-level commands, wherein the host-level commands are compatible with the at least one cloud computing service.

13. The one or more non-transitory computer-readable media of claim 8, wherein the host-level commands include at least one of allocation commands, provisioning commands, or deployment commands.

14. The one or more non-transitory computer-readable media of claim 8, wherein the instructions, when executed by the one or more processors, further cause:

using, by the intermediary system, the specification to parse at least one website associated with the at least one cloud computing service to thereby extract pricing information for the specification from the at least one website;

generating, by the intermediary system, a second quote using the pricing information extracted from the at least one website, wherein the second quote is for configuring the one or more computing devices in the at least one cloud computing service described in the specification.

15. A computing system comprising:

one or more computer systems comprising one or more hardware processors and storage media; and instructions stored in the storage media and which, when executed by the computing system, cause the computing system to perform:

generating, by an intermediary system, a specification that includes system-provided configuration settings for a software deployment to at least one cloud computing service;

updating, by the intermediary system, the specification with user-provided configuration settings;

parsing generic pricing information received from an application programming interface of the at least one cloud computing service to generate parsed pricing information;

combining the parsed pricing information with the specification to generate a quote for the specification;

coordinating, by the intermediary system, the software deployment, according to the specification, by sending host-level commands to the at least one cloud computing service, wherein each of the host-level commands is programmed to cause the at least one cloud computing service to configure one or more computing devices in the at least one cloud computing service.

16. The computing system of claim 15, wherein the system-provided configuration settings include default pre-stored configuration settings, wherein the default pre-stored configuration settings include at least one of security configuration settings or compliance configuration settings.

17. The computing system of claim 15, wherein the system-provided configuration settings include configuration settings from an existing specification.

18. The computing system of claim 15, wherein the coordinating the software deployment comprises translating, by the intermediary system, contents of the specification into the host-level commands, wherein the host-level commands are compatible with the at least one cloud computing service.

19. The computing system of claim 15, wherein the host-level commands include at least one of allocation commands, provisioning commands, or deployment commands.

20. The computing system of claim 15, the instructions being stored in the storage media and which, when executed by the computing system, cause the computing system to further perform:

using, by the intermediary system, the specification to parse at least one website associated with the at least one cloud computing service to thereby extract pricing information for the specification from the at least one website;

generating, by the intermediary system, a second quote using the pricing information extracted from the at least one website, wherein the second quote is for configuring the one or more computing devices in the at least one cloud computing service described in the specification.

* * * * *